United States Patent
Kwon et al.

(10) Patent No.: US 10,531,484 B2
(45) Date of Patent: Jan. 7, 2020

(54) METHOD AND APPARATUS FOR ALLOCATING RESOURCE IN COMMUNICATION SYSTEM

(71) Applicant: Samsung Electronics Co., Ltd., Gyeonggi-do (KR)

(72) Inventors: Sang-Wook Kwon, Suwon-si (KR); Anil Agiwal, Suwon-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/796,628

(22) Filed: Oct. 27, 2017

(65) Prior Publication Data

US 2018/0124819 A1 May 3, 2018

(30) Foreign Application Priority Data

Oct. 28, 2016 (KR) .................... 10-2016-0142294

(51) Int. Cl.
*H04W 72/14* (2009.01)
*H04W 72/04* (2009.01)
*H04W 88/02* (2009.01)
*H04W 88/08* (2009.01)

(52) U.S. Cl.
CPC ......... *H04W 72/14* (2013.01); *H04W 72/044* (2013.01); *H04W 72/046* (2013.01); *H04W 88/02* (2013.01); *H04W 88/08* (2013.01)

(58) Field of Classification Search
CPC . H04W 72/14; H04W 72/044; H04W 72/046; H04W 88/02; H04W 88/08
See application file for complete search history.

(56) References Cited

U.S. PATENT DOCUMENTS

| 8,675,578 B2 | 3/2014 | Kim et al. | |
| 2010/0272059 A1* | 10/2010 | Bienas | H04W 36/385 370/330 |
| 2013/0045675 A1 | 2/2013 | Park | |
| 2013/0163544 A1 | 6/2013 | Lee et al. | |
| 2013/0172002 A1 | 7/2013 | Yu et al. | |
| 2013/0182683 A1 | 7/2013 | Seol et al. | |
| 2013/0208633 A1* | 8/2013 | Gao | H04L 1/1861 370/280 |

(Continued)

OTHER PUBLICATIONS

International Search Report dated Jan. 24, 2018 in connection with International Patent Application No. PCT/KR2017/012022.

(Continued)

*Primary Examiner* — Dinh Nguyen

(57) ABSTRACT

The present disclosure relates 5G or pre-5G communication systems for supporting higher data transmission rate than those by LTE or other post-4G communication systems. According to an embodiment of the present disclosure, a method for allocating a resource in a communication system includes determining a beam to be used for data communication between a UE and the base station based on beam feedback information from the UE. The method also includes releasing resource allocation for a beam used previously depending on whether the determined beam is changed from the previously used beam, allocating a resource for the determined beam, and transmitting information related to the resource allocation for the determined beam to the UE.

24 Claims, 18 Drawing Sheets

DL SPS Configuration

(56) References Cited

U.S. PATENT DOCUMENTS

2016/0183233 A1* 6/2016 Park .................... H04W 16/30
                                                    370/331
2016/0192358 A1  6/2016 Lee et al.
2018/0115354 A1* 4/2018 Athley ............... H04W 72/046
2018/0213549 A1* 7/2018 Kim ................... H04W 72/087

OTHER PUBLICATIONS

Written Opinion of the International Searching Authority dated Jan. 24, 2018 in connection with International Patent Application No. PCT/KR2017/012022.

* cited by examiner

METHOD AND APPARATUS FOR ALLOCATING RESOURCE IN COMMUNICATION SYSTEM

CROSS-REFERENCE TO RELATED APPLICATION AND CLAIM OF PRIORITY

This application is related to and claims priority to Korean Patent Application No. 10-2016-0142294 filed on Oct. 28, 2016, the contents of which are incorporated herein by reference.

TECHNICAL FIELD

The present disclosure concerns methods and apparatuses for allocating resources based on semi-persistent scheduling (SPS) in communication systems.

BACKGROUND

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

Other techniques being developed for 5G systems are among hybrid frequency shift keying (FSK) and quadrature amplitude modulation (QAM) (FQAM) and sliding window superposition coding (SWSC), as advanced coding modulation (ACM) schemes, and filter bank multi-carrier (FBMC), non-orthogonal multiple access (NOMA), and sparse code multiple access (SCMA), as advanced access techniques.

Diversified wireless techniques are recently under development to handle soaring broadband service subscribers and offer better service quality. The 3rd Generation Partnership Project 2 (3GPP2) has developed code division multiple access 2000 (CDMA2000), 1x evolution data optimized (1×EVDO), and ultra-mobile broadband (UMB) systems, and the 3GPP has developed wide-band CDMA (WCDMA), high speed packet access (HSPA), and long term evolution (LTE) systems. The institute of electrical and electronics engineer (IEEE) has developed mobile worldwide interoperability for microwave access (WiMAX) systems. As more and more communication services are provided through mobile communication systems, there is increasing demand for high-capacity, high-throughput, low-latency, and more reliable mobile communication systems.

One noticeable candidate is super mobile broadband (SMB) that is based on radio waves with a wavelength range from 1 mm to 10 mm which corresponds to a radio frequency band from 30 GHz to 300 GHz. This next-generation mobile communication technology draws attention particularly because of its availability of wide mmWave bands. As set forth in the paper "An introduction to Millimeter-Wave Broadband Systems" authored by Zhouye Pi and Farooq Khan, an SMB network consists of multiple SMB base stations that cover a certain geographical area. To ensure better coverage, the SMB base stations need to be deployed more densely than macro cellular base stations. Generally, substantially the same inter-site distance is recommended in arranging micro cells or pico cells in a city environment. High-frequency radio waves may not reach a long distance because they suffer from more propagation loss.

Beamforming may be used to address such issue. Beamforming techniques may be classified into transmission (TX) beamforming that is performed on the TX end and reception (RX) beamforming that is performed on the RX end. Typically, TX beamforming uses multiple antennas to collectively direct radio waves to a particular spot, raising directivity. In such context, the aggregation of the multiple antennas may be denoted an antenna array, and each antenna in the antenna array may be denoted an array element. The antenna array may be configured in various forms, e.g., a linear array or planar array. The use of TX beamforming may lead to better signal directivity and increased propagation distance. Further, TX beamforming may reduce signal interference at the RX end because most of the signals from the antenna array are directed at the RX end. The RX end may perform beamforming on RX signals using an RX antenna array. RX beamforming allows radio waves to concentrate in a particular direction, increasing the strength of RX signals that are transmitted in the direction while getting rid of signals that have been sent in different directions. By so doing, RX beamforming may block interference signals.

In such a beamforming system, a user equipment (UE) receives a DL grant and relevant data using the best RX beam when receiving downlink (DL) data. A base station transmits a DL grant and relevant data using the best TX beam. In the beamforming system, the base station transmits an uplink (UL) grant using the best TX beam when transmitting UL data, and the UE receives the UL grant using the best RX beam. Upon the UL grant, the UE transmits UL data using the best TX beam.

The beamforming system allocates resources based on the SPS to respond to periodic traffic which may occur upon using, e.g., voice over internet protocol (VoIP). The SPS-based resource allocation in the beamforming system contributes to reducing control overhead.

Now described with reference to FIGS. 1 and 2 is the operation of a beamforming system that allocates resources based on the SPS.

FIG. 1 illustrates the operation of the beamforming system that allocates resources based on DL SPS.

Referring to FIG. 1, two users (e.g., UE1 and UE2) are using DL SPS. UE1 and UE2 are allocated to have DL SPS resources within the same subframe 100.

In the beamforming system, UE1 and UE2 receive DL data within the allocated DL resources using their respective best RX beams (e.g., DL RX beams). A base station uses the best TX beam, e.g., the optimal DL TX beam known by UE1 and UE2, to transmit data to UE1 and UE2 within the allocated DL grant. Where UE1 and UE2 are located within the same optimal DL TX beam coverage, UE1 and UE2 are allocated their respective DL SPS resources in the same subframe 100. Even when UE1 and UE2 are located in different optimal DL TX beam coverage ranges, and the base station has separate antenna arrays for simultaneously transmitting to the UEs, UE1 and UE2 may be allocated their respective SPS resources in the same subframe 100.

However, the movement of the UEs may frequently vary the TX beams/RX beams that are used for transmission/reception in the beamforming system. If the TX beam of the base station varies, the allocated DL SPS resource allocations may be required to change. For example, where the DL TX beam covering UE1 and UE2 is varied when the base station lacks separate antenna arrays to support UE1 and UE2, the allocated DL SPS resource allocations need to be varied for UE1 and UE2. The variations in the optimal RX beams of the UEs do not require variations in the allocated DL SPS resource allocations. The allocated DL SPS resource allocation may be required to frequently update depending on the width of TX beam of the base station and the movement of the UEs, and this may defeat the purpose of SPS.

Similar to the operation of allocating SPS on DL, the operation of allocating resources based on SPS is carried out on UL as well.

FIG. 2 illustrates the operation of the beamforming system that allocates resources based on UL SPS.

Referring to FIG. 2, when two users (e.g., UE1 and UE2) are using DL SPS, UE1 and UE2 are allocated to have UL SPS resources within the same subframe 200.

Where UE1 and UE2 are located within the same optimal UL RX beam coverage, UE1 and UE2 are allocated their respective UL SPS resources in the same subframe 200. Even when UE1 and UE2 are located in different optimal UL RX beam coverage ranges, and the base station has separate antenna arrays for simultaneously receiving from the UEs, UE1 and UE2 may be allocated their respective SPS resources in the same subframe 200.

However, the movement of the UEs may frequently vary the TX beams/RX beams that are used for transmission/reception in the beamforming system. If the RX beam of the base station varies, the allocated UL SPS resource allocations may be required to change. For example, where the UL RX beam covering UE1 and UE2 is varied when the base station lacks separate antenna arrays to receive from UE1 and UE2, the allocated UL SPS resource allocations need to be varied for UE1 and UE2. The variations in the optimal TX beams of the UEs do not require variations in the allocated UL SPS resource allocations. The allocated UL SPS resource allocation may be required to frequently update depending on the width of RX beam of the base station and the movement of the UEs, and this may defeat the purpose of SPS.

Thus, a need exists for enhancing the SPS-based resource allocation method and procedure in conventional beamforming systems.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for allocating resources based on SPS in a communication system.

According to an embodiment of the present disclosure, there are provided a method and apparatus for allocating resources based on SPS considering information about the beam of the base station in a communication system.

According to an embodiment of the present disclosure, there are provided a method and apparatus for allocating resources based on SPS considering information about the beam of the UE in a communication system.

According to an embodiment of the present disclosure, a method for allocating a resource in a communication system comprises determining a beam to be used for data communication between a UE and the base station based on beam feedback information from the UE, releasing resource allocation for a beam used previously depending on whether the determined beam is changed from the previously used beam, allocating a resource for the determined beam, and transmitting information related to the resource allocation for the determined beam to the UE.

According to an embodiment of the present disclosure, a method for allocating a resource in a communication system comprises transmitting beam feedback information including information about a beam to be used for data communication between a UE and a base station, receiving information related to resource allocation for a beam determined based on the beam feedback information depending on whether the determined beam is changed from a beam previously used, and identifying a resource allocated based on the information related to the resource allocation for the determined beam.

According to an embodiment of the present disclosure, a base station for allocating a resource in a communication system comprises a transceiver transmitting and receiving data and a controller performing control to determine a beam to be used for data communication between a UE and the base station based on beam feedback information from the UE, release resource allocation for a beam used previously depending on whether the determined beam is changed from the previously used beam, allocate a resource for the determined beam, and transmit information related to the resource allocation for the determined beam to the UE.

According to an embodiment of the present disclosure, a UE for allocating a resource in a communication system comprises a transceiver transmitting and receiving data and a controller transmitting beam feedback information including information about a beam to be used for data communication between the UE and a base station, receiving information related to resource allocation for a beam determined based on the beam feedback information depending on whether the determined beam is changed from a beam previously used, and identifying a resource allocated based on the information related to the resource allocation for the determined beam.

Other aspects, advantages, and core features of the present disclosure will be apparent to one of ordinary skill in the art from the following detailed description taken in conjunction with the accompanying drawings and disclosing preferred embodiments of the present disclosure.

Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with,"

"interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

It should be noted that the same or similar reference denotations may be used to refer to the same or similar elements, features, or structures throughout the drawings.

DETAILED DESCRIPTION

Figure 1:
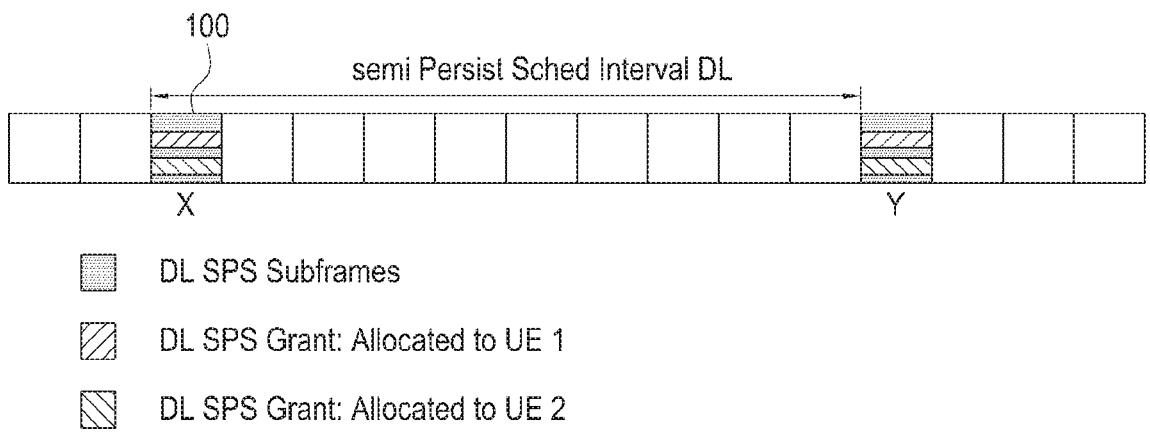
FIG. 1 illustrates the operation of allocating a resource based on DL SPS in a beamforming system.
Figure 2:
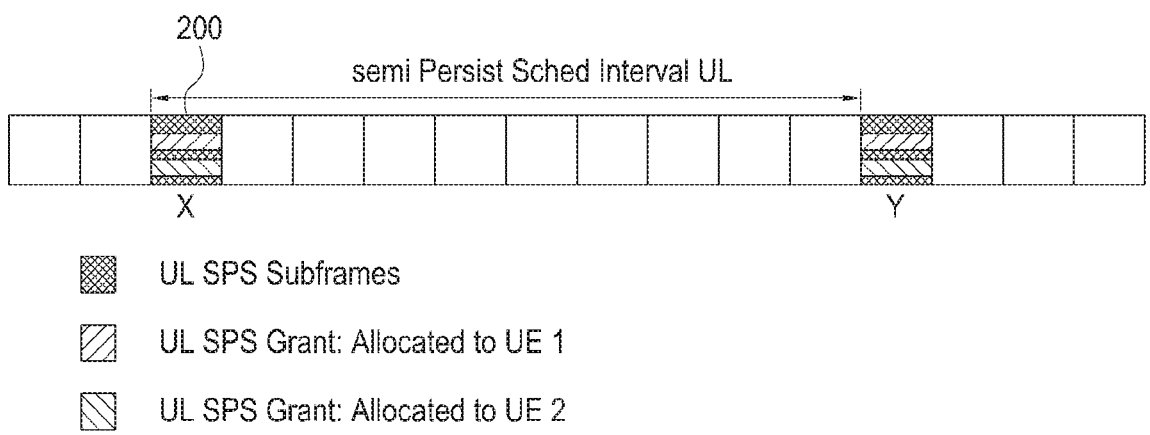
FIG. 2 illustrates the operation of allocating a resource based on UL SPS in a beamforming system.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms and words used herein should not be interpreted as limited to their literal meanings, and it should be noted that they are rather provided merely for a clear and consistent understanding of the present disclosure. Thus, it is apparent to one of ordinary skill in the art that the detailed description of various embodiments of the present disclosure is intended for description purposes alone, but not for limiting the subject matter of the present disclosure defined by the appended claims and equivalents thereof.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. Such terms as those generally defined in the dictionary should be appreciated to be consistent with contextual meanings of relevant technology.

According to the present disclosure, there are provided a method and apparatus for allocating resources based on SPS when a beam is varied depending on information about a beam of a base station and information about a state of a UE in a beamforming system.

To that end, a method and apparatus for allocating resources based on SPS in a beamforming system according to embodiments of the present disclosure are described with reference to the drawings. As used herein, "allocate resource(s)" may be interpreted in the same meaning as "set or configure resource(s)."

Figure 3A:
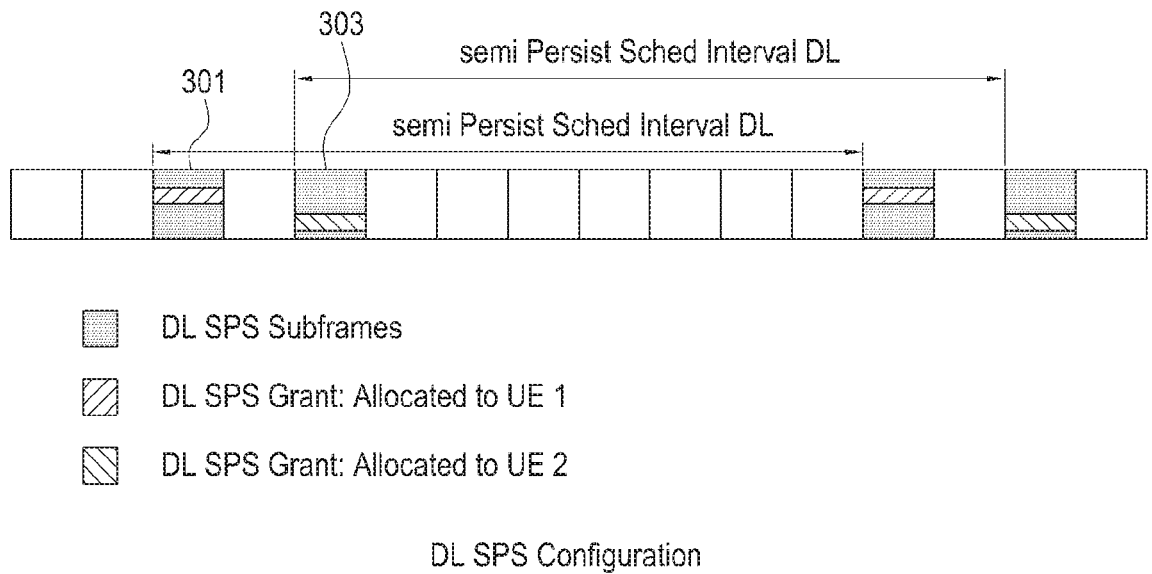
FIGS. 3A and 3B illustrate a method for allocating a resource based on SPS in a beamforming system according to a first embodiment of the present disclosure.
Figure 3B:
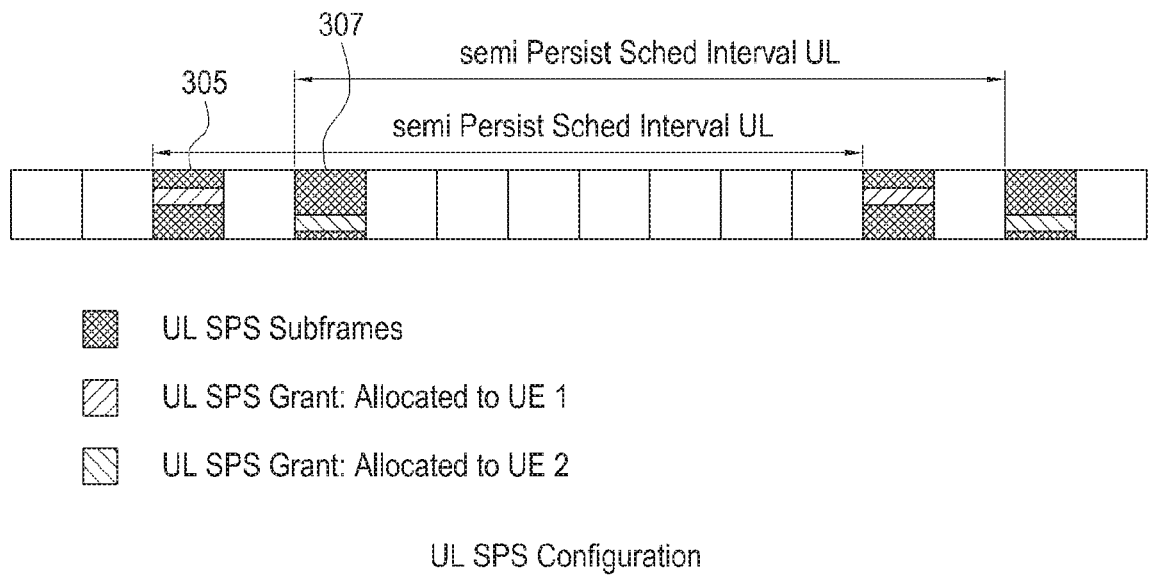

FIGS. 3A and 3B illustrate a method for allocating a resource based on SPS in a beamforming system according to a first embodiment of the present disclosure.

FIG. 3A illustrates a resource allocated based on DL SPS as proposed herein. Here, in the first embodiment of the present disclosure, the number of UEs having a DL SPS resource allocation within the same DL subframe may be equal or smaller than the number of TX antenna arrays in a base station.

As an example, when the number of TX antenna arrays in the base station is one, the number of UEs having the DL SPS resource allocation within one DL subframe 301 may be set to one as shown in FIG. 3A.

When the number of UEs already allocated to have the DL SPS resource allocation within the DL subframe 301 is the same as the number of TX antenna arrays of the base station, the base station provides the DL SPS resource allocation in a subframe 303 that differs from the subframe 301 allocated for the first UE when allocating a DL SPS resource allocation for another UE.

FIG. 3B illustrates a resource allocated based on UL SPS as proposed herein. Here, in the first embodiment of the present disclosure, the number of UEs having a UL SPS resource allocation within the same UL subframe may be equal or smaller than the number of RX antenna arrays in a base station.

As an example, when the number of RX antenna arrays in the base station is one, the number of UEs having the DL SPS resource allocation within one UL subframe 305 may be set to one as shown in FIG. 3B. When the number of UEs already allocated to have the UL SPS resource allocation within the UL subframe 305 is the same as the number of RX antenna arrays of the base station, the base station provides the UL SPS resource allocation in a subframe 307 that differs from the subframe 305 allocated for the first UE when allocating a UL SPS resource allocation for another UE.

Figure 4:
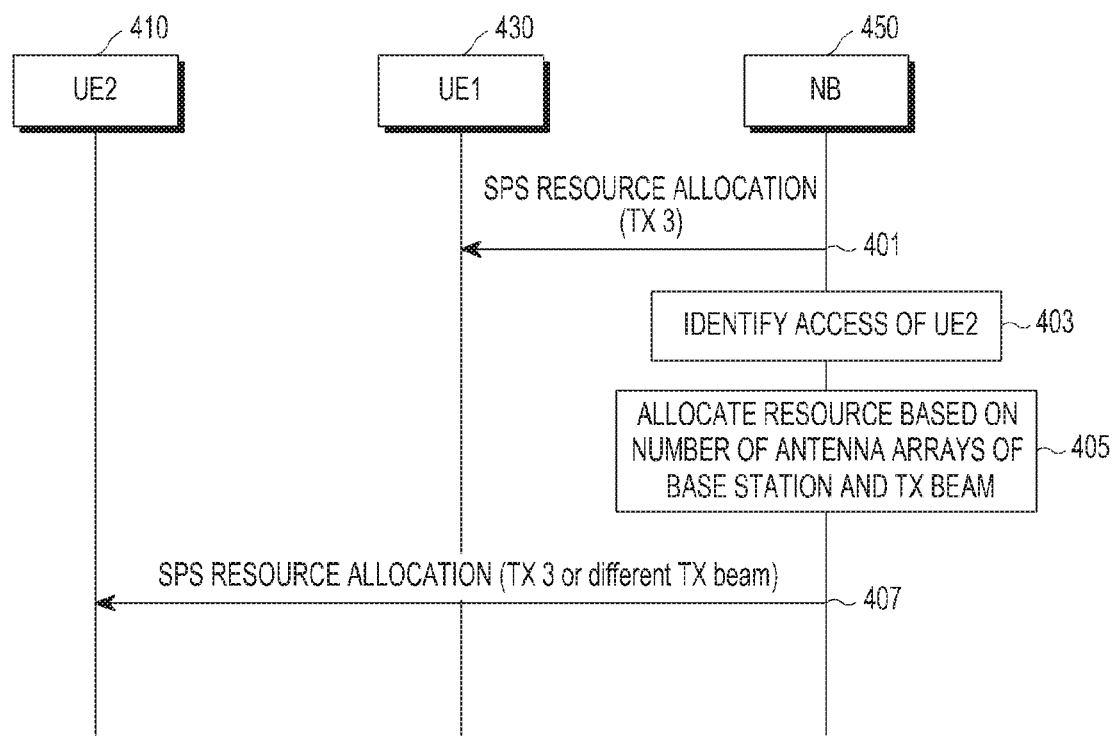
FIG. 4 illustrates a method for allocating a resource based on SPS in a beamforming system according to the first embodiment of the present disclosure.

FIG. 4 illustrates an example of a method for allocating a resource based on SPS in a beamforming system according to the first embodiment of the present disclosure. In FIG. 4, it is assumed that UE1 430 has already been allocated base station TX No. 3 (hereinafter, TX3) for DL SPS resource allocation and that the base station has one TX antenna array. Here, the base station 450 may be a base station for 5G communication (e.g., 5G node B or 5G NB).

Referring to FIG. 4, the base station 450 sends the indication that TX3 has been allocated as DL SPS resource to UE1 430 in a first subframe (401).

Thereafter, upon identifying that a new UE, e.g., UE2 410, accesses (403), the base station 450 allocates a resource for UE2 410 based on the number of TX antenna arrays and the base station TX beam for UE2 410 (405). At this time, since the base station TX beam for UE2 410 is TX3 and is thus the same as the base station TX beam for UE1 430, the base station 450 may allocate the DL SPS resource allocation for UE2 410 to the same first subframe as UE1 420. In contrast, where the base station TX beam for UE2 410 is not TX3, the base station 450 should allocate the DL SPS resource allocation for UE2 410 to a second subframe that is different from that for UE1 430 since the number of base station TX antenna arrays is one and the base station TX beam differs from that for UE1 430.

The base station 450 sends the base station TX beam for UE2 410 to UE2 410 in the first subframe or second subframe depending on the results of the resource allocation.

The resource allocation method according to the first embodiment described with reference to FIGS. 3 and 4 does not require updating the UL SPS resource or DL SPS resource allocation due to a beam change. However, the resource allocation method according to the first embodiment described with reference to FIG. 3 may restrict the scheduler and thus reduce the SPS capacity. For example, only 100 VoIP users may be supported under the assumption that the base station has one antenna array and that the TTI is 0.2 ms. There may be 100 TTIs within a 20 ms interval, and each UE may be allocated a resource within a different TTI.

To that end, another example of a method for allocating a resource based on SPS in a beamforming system according to the first embodiment of the present disclosure is proposed as shown in FIG. 5.

Figure 5A:
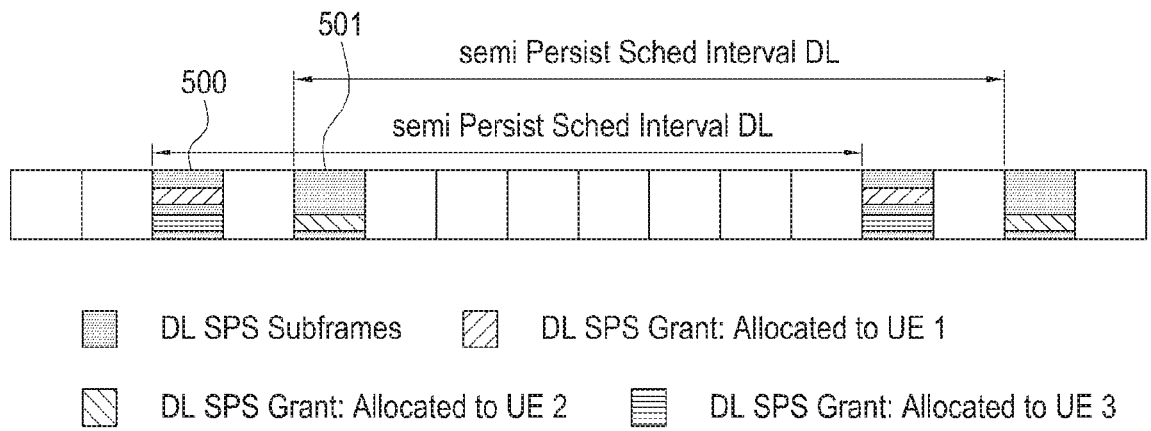
FIGS. 5A and 5B illustrate a method for allocating a resource based on SPS in a beamforming system according to a first embodiment of the present disclosure.
Figure 5B:
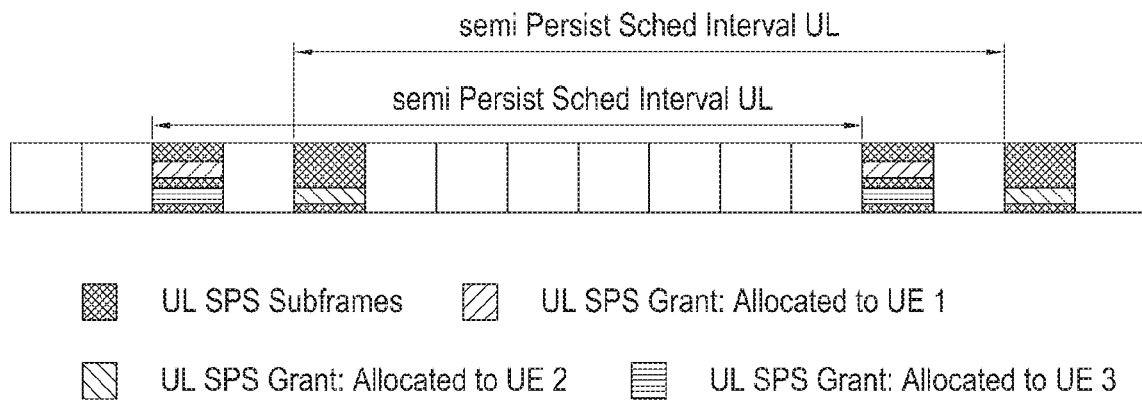

FIGS. 5A and 5B illustrate a method for allocating a resource based on SPS in a beamforming system according to the first embodiment of the present disclosure.

FIG. 5A shows a resource allocated based on DL SPS as proposed according to the present disclosure, and FIG. 5B shows a resource allocated based on UP SPS according to the present disclosure.

Referring to FIGS. 5A and 5B, the base station may allocate resources to low-mobility UEs or UEs for which beam changes are infrequent in the same subframe. At this time, where the base station has one antenna array, the UEs allocated to one subframe should be present within the same beam coverage. Where the base station has N antenna arrays, the UEs allocated to one subframe should be present within the coverage of one of the N beams.

Accordingly, where UE2 has high mobility or experiences frequent beam changes in FIGS. 5A and 5B, the base station may allocate a resource in a separate subframe 510. In contrast, where UE1 and UE3 are UEs having low mobility or infrequent beam changes, the base station may allocate resources in the same subframe 500.

Now described with reference to FIGS. 6 to 11 are methods for allocating a resource based on SPS in a beamforming system according to a second embodiment of the present disclosure.

Figure 6:
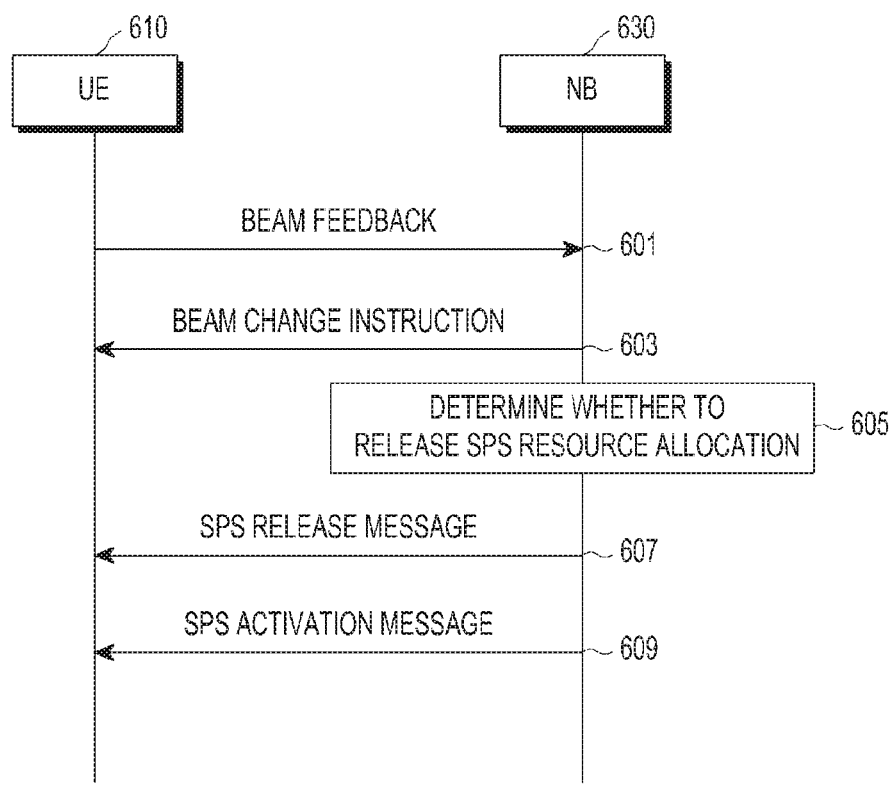
FIG. 6 illustrates a method for allocating a resource based on SPS in a beamforming system according to a second embodiment of the present disclosure.

FIG. 6 illustrates a method for allocating a resource based on SPS in a beamforming system according to a second embodiment of the present disclosure. In the second embodiment of the present disclosure, beam reciprocity is presumed. In other words, TX beam coverage is presumed to be the same as RX beam coverage.

Referring to FIG. 6, the UE 610 reports the best or optimal TX beam(s) to the base station 630 through beam feedback (601). The base station 630 then sends a beam change indication to the UE 610 responsive to the beam feedback (603). In the operation that the operation that the base station 630 transmits the beam change indication to the UE 610, the beam change indication may optionally indicate the DL TX beam selected by the base station 630. As an embodiment, where a plurality of DL TX beams have been reported through beam feedback by the UE 610, the beam change indication may include the DL TX beam that the base station 630 has selected from among the plurality of DL TX beams. At this time, DL TX beam changes' means that 'UL RX beam changes as well.'

Accordingly, the base station 630 determine whether to release the current SPS resource allocation according to whether at least one of DL beam and RX beam changes based on the beam feedback received from the UE 610 (605). Here, the current SPS resource allocation features resource allocation for the beam used before change.

Where the base station 630 determines to release the current SPS resource allocation according to whether at least one of DL TX beam and RX beam changes, the base station 630 sends a SPS resource allocation release message (SPS Release) to the UE 610 (607). As an example, where the DL TX beam changes, the base station 630 may release the settings for the current DL SPS resource allocation, and where the UL RX beam changes, the base station 630 may release the settings for the current UL SPS resource allocation. The base station 630 may independently transmit the setting release for DL SPS resource allocation and/or UL SPS resource allocation to the UE 610. Thereafter, the base station 630 may transmit an SPS activation message (SPS Activation) for independently activating a new SPS resource allocation for DL and/or UL to the UE 610 (609). Here, the new SPS resource allocation features resource allocation for the changed beam.

In other words, the second embodiment of the present disclosure features that an SPS resource change (i.e., a change in at least one of the current SPS resource allocation release and the new SPS resource allocation activation) is initiated according to the beam change.

Figure 7:
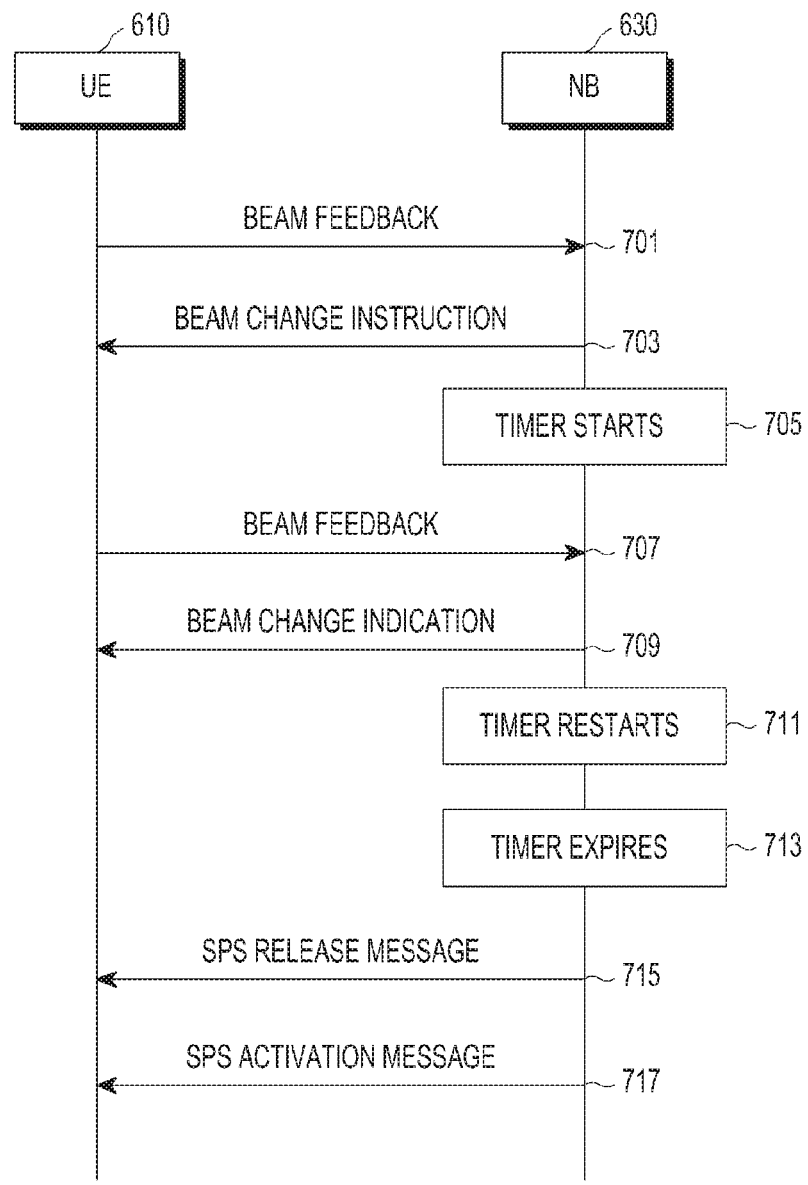
FIG. 7 illustrates a method for allocating a resource based on SPS in a beamforming system according to the second embodiment of the present disclosure.

FIG. 7 illustrates a method for allocating a resource based on SPS in a beamforming system according to a second embodiment of the present disclosure.

In the embodiment of FIG. 7, the base station 630 changes SPS resource allocations when the beam should be changed for a particular time but rather than whenever a beam change occurs.

Referring to FIG. 7, the UE 610 reports the best or optimal TX beam(s) to the base station 630 through beam feedback (701). When the beam should be changed, the base station 630 then sends a beam change indication to the UE 610 responsive to the beam feedback (703). At this time, the base station 630 starts the timer when a first beam change occurs (705).

The UE 610 reports the best or optimal TX beam(s) to the base station 630 through beam feedback (707). When the beam should be changed, the base station 630 then sends a beam change indication to the UE 610 responsive to the beam feedback (709). At this time, whenever a beam change occurs (i.e., without transmission of the beam change indication, or after beam change, or after receiving beam feedback when the beam changes), the base station 630 restarts the timer (711). In other words, when the timer is running at the time of the beam change, the timer is reset or restarted. Here, the timer stops at the start of an SPS interval. Since different SPS intervals may be provided for DL and UL SPS resource allocations, their respective timers may be managed.

Thereafter, when the base station 630 verifies that the timer expires (713), the base station transmits an SPS resource allocation release message (SPS Release) to the UE 610 because the beam is changed and the changed beam is valid (since it is subject to no further change) (715). The base station 630 transmits an SPS activation message (SPS Activation) to the UE 610 to activate a new SPS resource allocation (717).

Figure 8:
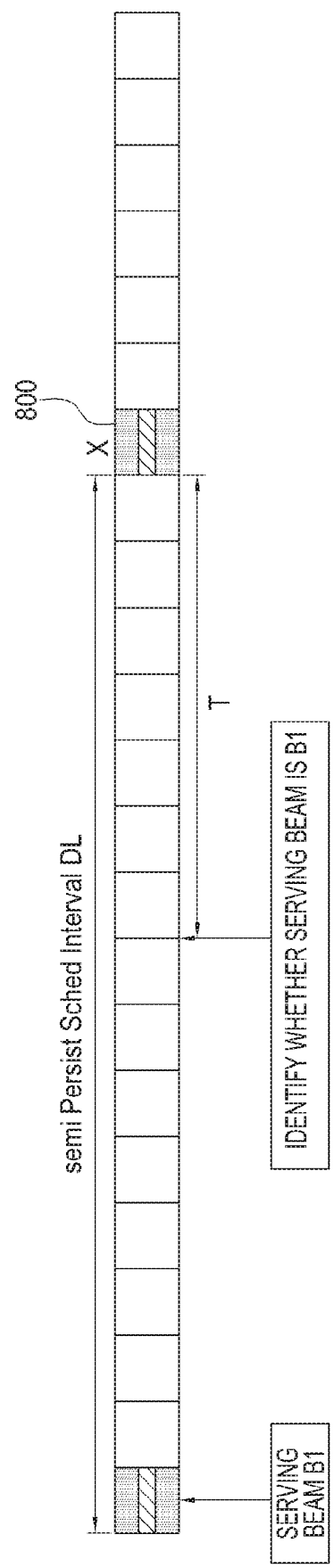
FIG. 8 illustrates a method for allocating a resource based on SPS in a beamforming system according to the second embodiment of the present disclosure.

As an alternative to the embodiment described in connection with FIG. 7, when the timer is running even at a particular T time before the start of the subframe corresponding to the SPS resource allocation as shown in FIG. 8, the base station 630 may stop the timer, send an SPS resource allocation release message, and then activate a new SPS resource allocation.

FIG. 8 illustrates a method for allocating a resource based on SPS in a beamforming system according to a second embodiment of the present disclosure.

Referring to FIG. 8, the base station identifies whether the serving TX/RX beam at the particular "T" time before the start of the subframe 800 corresponding to the DL/UL SPS resource allocation is the same as the serving TX/RX beam used for a previous DL/UL SPS resource allocation. Where the serving TX/RX beam at the particular "T" time before the start of the subframe 800 is different from the serving TX/RX beam used for the previous DL/UL SPS resource allocation, the base station may transmit a DL/UL SPS resource allocation release message to the UE and then activate a new DL/UL SPS resource allocation.

Figure 9:
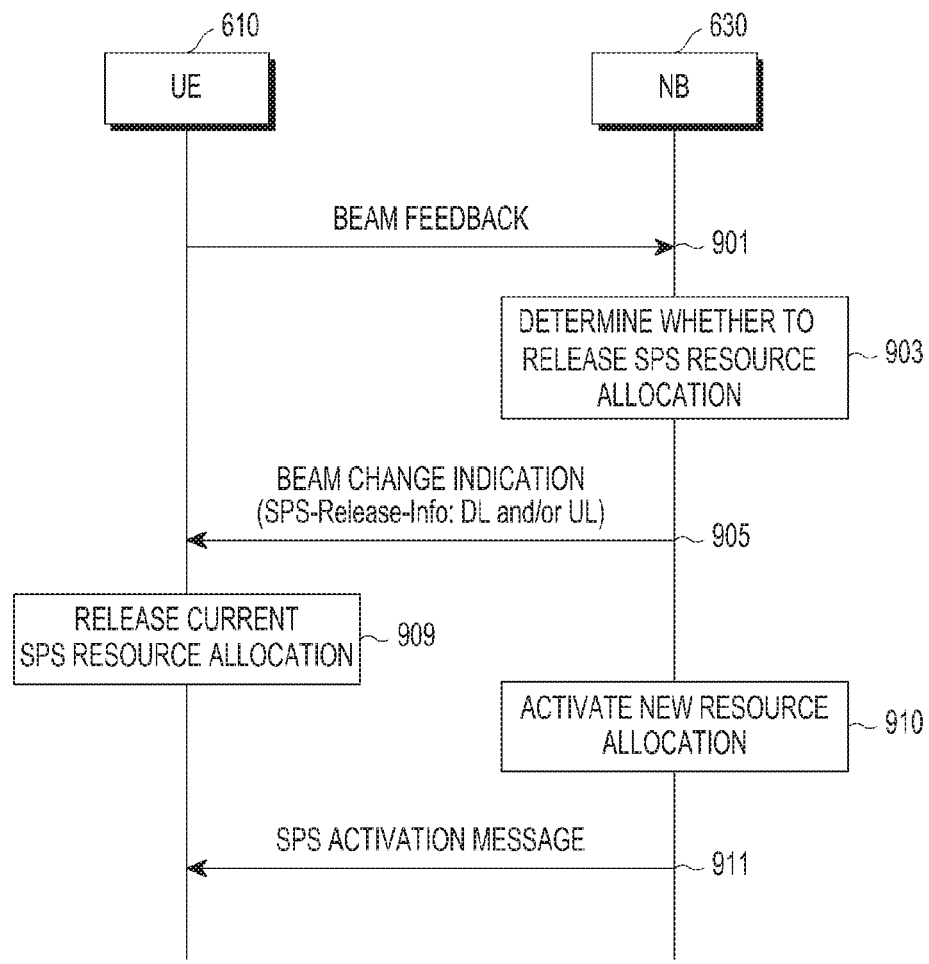
FIG. 9 illustrates a method for allocating a resource based on SPS in a beamforming system according to the second embodiment of the present disclosure.

FIG. 9 illustrates a method for allocating a resource based on SPS in a beamforming system according to a second embodiment of the present disclosure. The embodiment of FIG. 9 may be an alternative to the embodiment described in connection with FIG. 6. The instant embodiment relates to a method for including information (SPS-Release-Info) regarding the release of SPS resource allocation in a beam change indication. Here, the SPS resource allocation release-related information (SPS-Release-Info) is information related to the resource allocation of the changed beam.

Referring to FIG. 9, the UE 610 reports the best or optimal TX beam(s) to the base station 630 through beam feedback (901). Then, the base station 630 determine whether to release the current SPS resource allocation according to whether at least one of DL TX beam and RX beam changes based on the beam feedback received from the UE 610 (903).

The base station 630 transmits a beam change indication containing information (SPS-Release-Info) regarding the release of the current SPS resource allocation to the UE 610 (905). The SPS resource allocation release information (SPS-Release-Info) includes at least one of information for releasing the current DL SPS resource allocation and information for releasing the current UL SPS resource allocation. At this time, where the beam change indication indicates the release of the current SPS resource allocation, the cyclical redundancy check (CRC) of the physical downlink control channel (PDCCH) that indicates the beam change indication may be masked with the radio network temporary identifier (SPS-RNTI). In contrast, unless the beam change indication indicates the release of the current SPS resource allocation, the CRC of the PDCCH indicating the beam change indication may be masked with the C-RNTI (cell-RNTI).

Thereafter, upon receiving the beam change indication containing the information (SPS-Release-Info) regarding the SPS resource allocation release from the base station 630, the UE 610 releases the DL/UL SPS resource allocation that used to be allocated thereto (907).

The base station 630, as the DL/UL SPS resource allocation is required again, may activate the DL/UL SPS resource allocation (909) and send an SPS activation message (SPS Activation) to the UE 610 (911). At this time, the base station 630 may separately transmit the SPS activation message for DL SPS resource allocation and the SPS activation message for UL SPS resource allocation to the UE 610.

Figure 10:
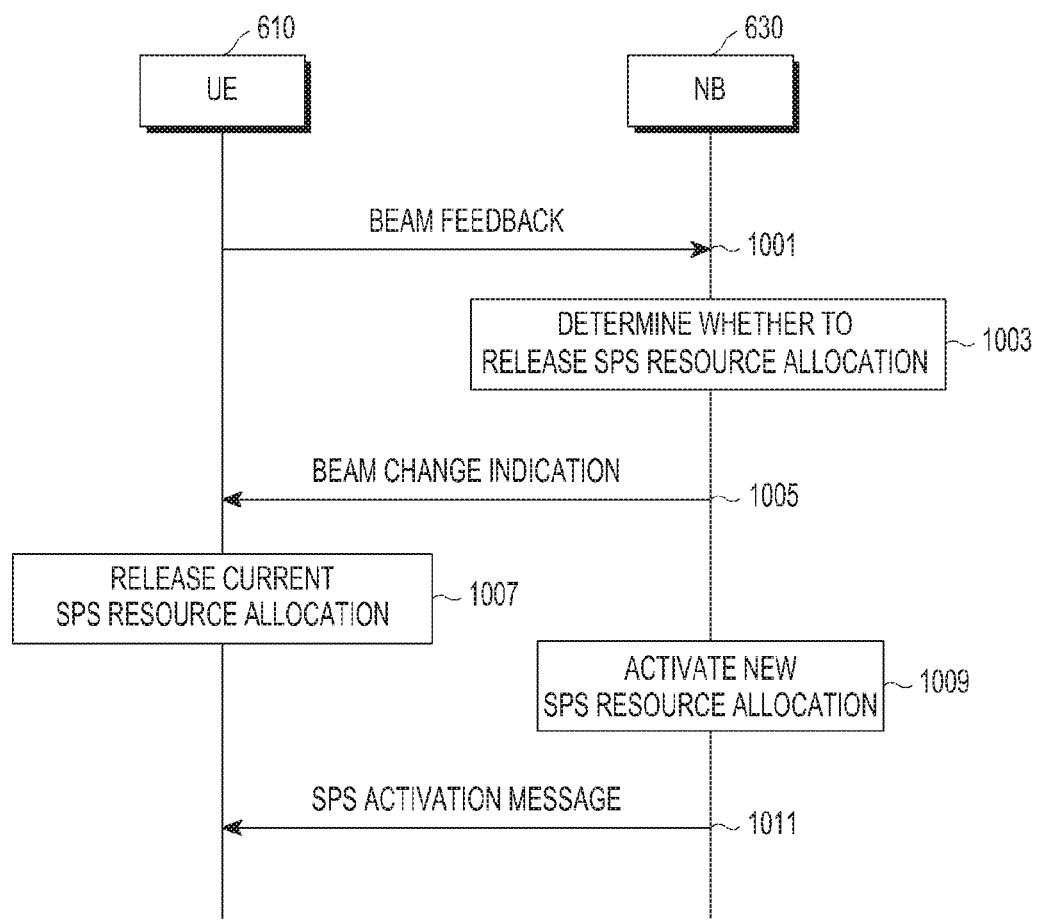
FIG. 10 illustrates a method for allocating a resource based on SPS in a beamforming system according to the second embodiment of the present disclosure.

FIG. 10 illustrates a method for allocating a resource based on SPS in a beamforming system according to a second embodiment of the present disclosure. The embodiment of FIG. 10 relates to a method by the UE 610 releases the SPS resource which used to be allocated thereto even when the beam change indication sent from the base station 630 to the UE 610 lacks the information (SPS-Release-Info) regarding the release of SPS resource allocation.

Referring to FIG. 10, the UE 610 reports the best or optimal TX beam(s) to the base station 630 through beam feedback (1101). Then, the base station 630 determine whether to release the SPS resource allocation according to whether at least one of DL TX beam and RX beam changes based on the beam feedback received from the UE 610 (1003).

The base station 630 transmits the beam change indication to the UE 610 (1005). At this time, where the beam change indication indicates the release of the SPS resource allocation, the CRC of the PDCCH indicating the beam change indication may be masked with the SPS-RNTI. By contrast, unless the beam change indication indicates the release of the SPS resource allocation, the CRC of the PDCCH indicating the beam change indication may be masked with the C-RNTI.

Thereafter, upon receiving the beam change indication from the base station 630, the UE 610 releases the DL/UL SPS resource allocation that used to be allocated thereto (1007). In other words, upon receiving the beam change indication from the base station 630, the UE 610 determines that the SPS resource allocation is not valid because the beam has been changed, and the UE 610 releases the DL/UL SPS resource allocation that used to be allocated thereto. In other words, although the beam change indication lacks the SPS resource allocation release-related information (SPS-Release-Info), the UE 610 itself may release the SPS resource allocation because the beam has changed.

The base station 630, as the DL/UL SPS resource allocation is required, may activate the DL/UL SPS resource allocation (1009) and send an SPS activation message (SPS Activation) to the UE 610 (1011). At this time, the base station 630 may separately transmit the SPS activation message for DL SPS resource allocation and the SPS activation message for UL SPS resource allocation to the UE 610.

Figure 11:
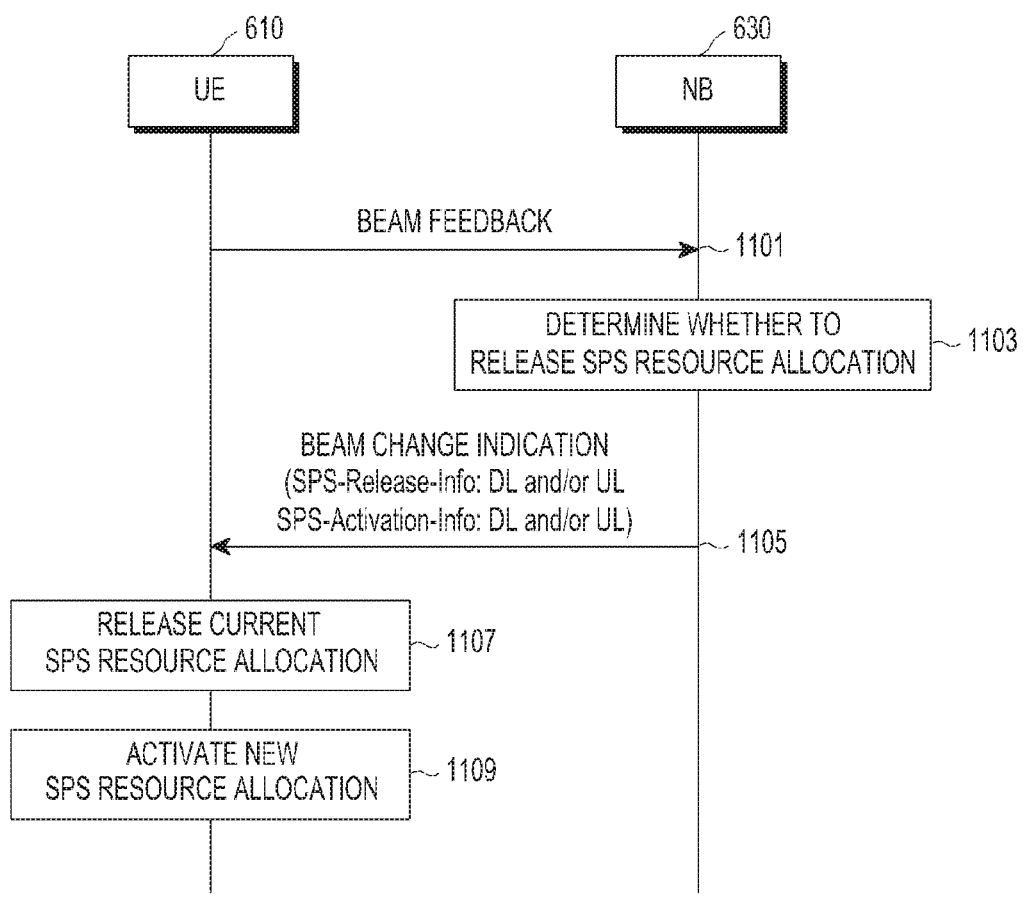
FIG. 11 illustrates a method for allocating a resource based on SPS in a beamforming system according to the second embodiment of the present disclosure.

FIG. 11 illustrates a method for allocating a resource based on SPS in a beamforming system according to a second embodiment of the present disclosure. The embodiment of FIG. 11 may be an alternative to the embodiment described in connection with FIG. 9. The instant embodiment relates to a method for including information (SPS-Release-Info) regarding the release of SPS resource allocation and information (SPS-Activation-Info) regarding the activation of SPS resource allocation in a beam change indication. Here, the SPS resource allocation release-related information (SPS-Release-Info) and the SPS resource allocation activation-related information (SPS-Activation-Info) are pieces of information related to the resource allocation of the changed beam.

Referring to FIG. 11, the UE 610 reports the best or optimal TX beam(s) to the base station 630 through beam feedback (1101). Then, the base station 630 determine whether to release the SPS resource allocation according to whether at least one of DL TX beam and RX beam changes based on the beam feedback received from the UE 610 (1103).

The base station 630 transmits a beam change indication containing the information (SPS-Release-Info) regarding the release of the SPS resource allocation and the information (SPS-Activation-Info) regarding the activation of SPS resource allocation to the UE 610 (1105). The SPS resource allocation release-related information (SPS-Release-Info) includes information for releasing the DL SPS resource allocation and information for releasing the UL SPS resource allocation. The SPS resource allocation activation-related information (SPS-Activation-Info) includes information for activating the DL SPS resource allocation and information for activating the UL SPS resource allocation. Here, the SPS resource allocation activation-related information (SPS-Activation-Info) may contain information indicating the start subframe corresponding to the activated DL and/or UL SPS resource allocation. The information indicating the start subframe is described below in greater detail with reference to a fourth embodiment of the present disclosure.

At this time, where the beam change indication indicates the release of the SPS resource allocation, the CRC of the PDCCH indicating the beam change indication may be masked with the SPS-RNTI. By contrast, unless the beam change indication indicates the release of the SPS resource allocation, the CRC of the PDCCH indicating the beam change indication may be masked with the C-RNTI.

Thereafter, upon receiving the beam change indication from the base station 630, the UE 610 releases the DL/UL SPS resource allocation which used to be allocated thereto based on the SPS resource allocation release-related information (SPS-Release-Info) contained in the beam change indication (1107). When a corresponding time arrives based on the SPS resource allocation activation-related information (SPS-Activation-Info) contained in the received beam change indication, the UE 610 activates the DL SPS resource allocation or UL SPS resource allocation (1109).

Although the communication system lacks beam reciprocity (i.e., where TX beam coverage differs from RX beam coverage), SPS-based resource allocation may be possible by the same method as at least one of the embodiments described above in connection with FIGS. 6 to 11.

In other words, the base station may determine the best or proper DL TX beam(s) based on the measurement made by the UE, according to an embodiment of the present disclosure. Specifically, the UE reports the best or proper DL TX beam(s) to the base station through beam feedback. Then, the base station transmits a beam change indication to the UE responsive to the beam feedback. Optionally, the beam change indication may indicate the DL TX beam selected by the base station. In an embodiment, where the UE reports a plurality of proper DL TX beams to the base station through the beam feedback, the beam change indication may contain information about one DL TX beam selected by the base station from among the plurality of proper DL TX beams. As the DL TX beam changes, the base station may start to release the DL SPS resource allocation. Accordingly, absent beam reciprocity, the DL SPS resource allocation release and activation method may be performed in the same process given in the embodiments described above in connection with FIGS. 6 to 11.

Figure 12:
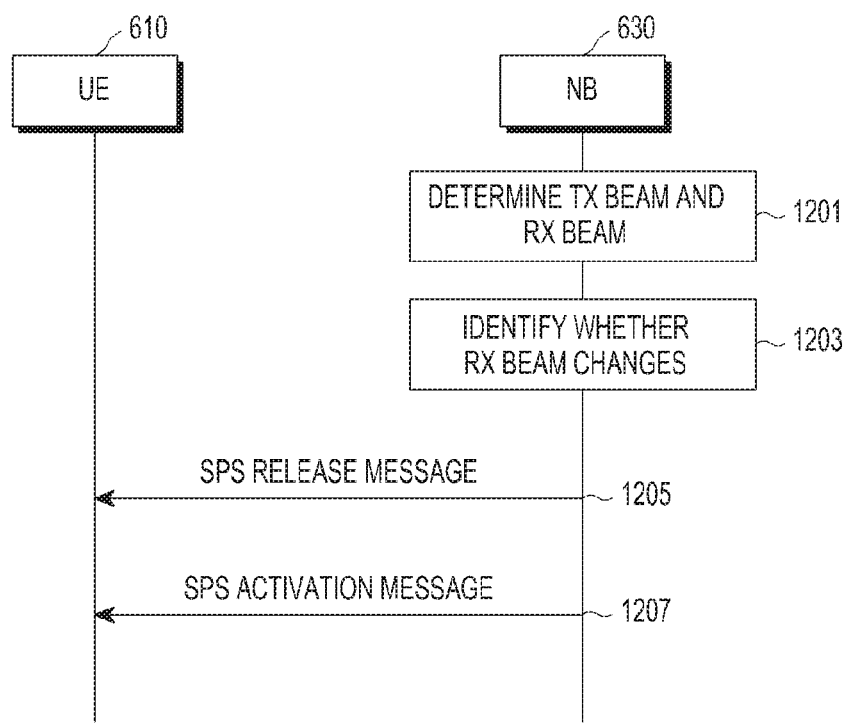
FIG. 12 illustrates a method for allocating a resource based on SPS in a beamforming system according to a third embodiment of the present disclosure.
Figure 13:
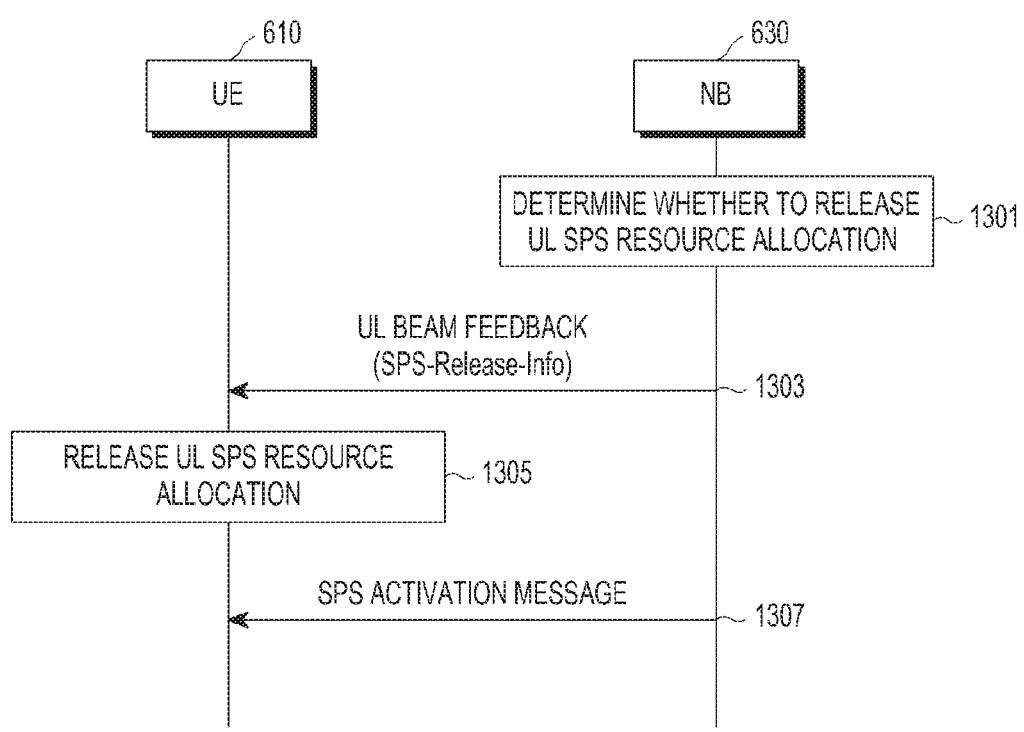
FIG. 13 illustrates a method for allocating a resource based on SPS in a beamforming system according to the third embodiment of the present disclosure.
Figure 14:
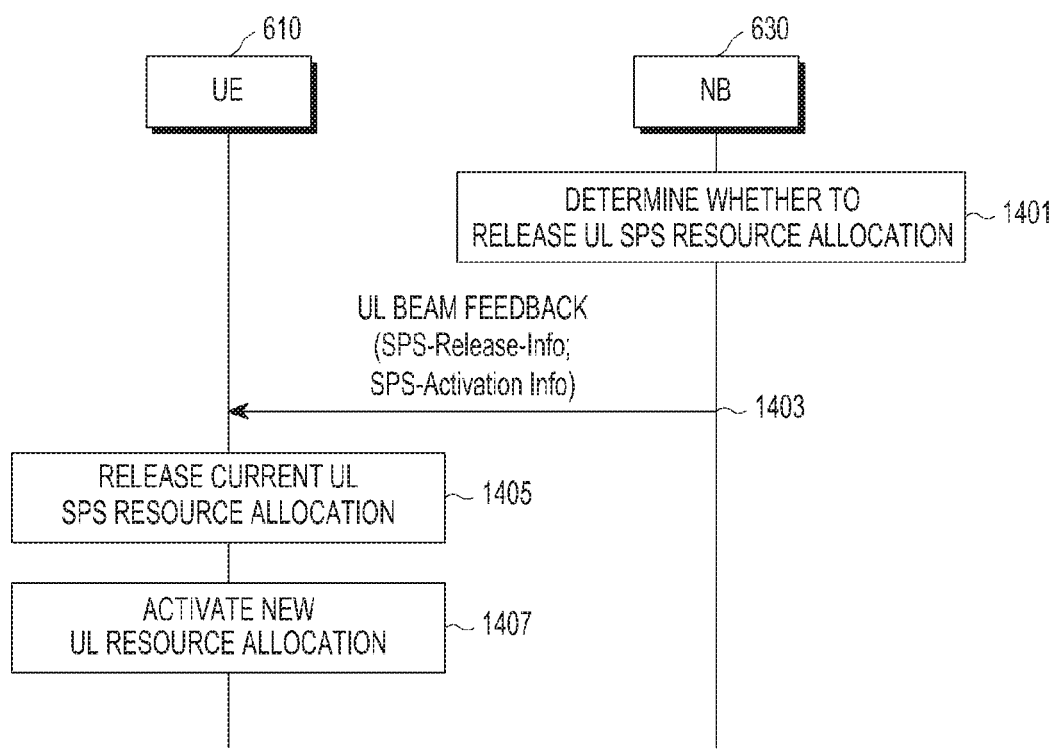
FIG. 14 illustrates a method for allocating a resource based on SPS in a beamforming system according to the third embodiment of the present disclosure.

Now described with reference to FIGS. 12 to 14 are methods for allocating a resource based on UL SPS in a beamforming system according to a third embodiment of the present disclosure.

FIG. 12 illustrates a method for allocating a resource based on UL SPS in a beamforming system according to a third embodiment of the present disclosure. Specifically, FIG. 12 illustrates a method for allocating UL SPS resources available in the beamforming system according to an embodiment of the present disclosure.

Referring to FIG. 12, the base station 630 determines the best or proper UL TX beam(s) and UL RX beam(s) based on a beam specific reference signal received from the UE 610. When the determined UL RX beam has been changed from the UL RX beam previously determined, the base station 630 transmits a UL SPS resource allocation release message (SPS Release) to the UE 610 because the UL SPS resource allocation from the 610 is invalid (1205). The base station 630 then allocates a new UL SPS resource allocation to the UE 610 and transmits an SPS resource allocation activation message (SPS Activation) to the UE 610 (1207).

As an alternative to the embodiment described above in connection with FIG. 12, UL SPS resource allocation may also be performed in the same manner given for the embodiments described above in connection with FIGS. 7 and 8. In other words, rather than sending UL SPS resource allocation release messages to the UE 610 whenever the UL RX beam changes, the base station 630 may use the timer as in the embodiments of FIGS. 7 and 8.

In other words, the base station 630 starts the timer when the UL RX beam changes, restarts the timer whenever the UL RX beam changes, and terminates the timer before UL SPS resource allocation is activated. Thus, as the timer expires, the base station 630 transmits a UL SPS resource allocation release message to the UE 610. The base station 630 activates a new UL SPS resource allocation for the UE 610. Where the timer is running even at a particular "T" time before the start of the subframe corresponding to the UL SPS resource allocation, the base station 630 may stop the timer, transmit a UL SPS resource allocation release message to the UE 610, and then activate a new UL SPS resource allocation. Where the beam being used before the start of the subframe corresponding to the UL SPS resource allocation differs from the beam used in the subframe corresponding to a previous UL SPS resource allocation, the base station 630 may send a UL SPS resource allocation release message to the UE 610 and then activate a new UL SPS resource allocation.

FIG. 13 illustrates a method for allocating a resource based on SPS in a beamforming system according to the third embodiment of the present disclosure. Specifically, the instant example is directed to a method for including SPS resource allocation release-related information (SPS-Release-Info) of UL in a UL beam feedback.

Referring to FIG. 13, the base station 630 determines whether to release the UL SPS resource allocation depending on whether the RX beam changes (1301). In other words, where the RX beam determined at the current time is changed from the RX beam previously determined, the base station 630 determines to release the UL SPS resource allocation.

When UL SPS resource allocation needs to be released upon sending a UL beam feedback that indicates that the UL optimal TX beam has changed to the UE 610, the base station 630 includes information regarding the release of UL SPS resource allocation in the UL beam feedback. In other words, the base station 630 transmits UL beam feedback information containing the UL SPS resource allocation release-related information (SPS-Release-Info) to the UE 610. At this time, where the UL optimal TX beam has changed, but the UL optimal RX beam has not, the UL SPS resource allocation does not need to be released. Thus, the base station 630 conveys the UL beam feedback containing only information indicating that the UL optimal TX beam has changed to the UE 610. At this time, where the beam change indication indicates the release of the SPS resource allocation, the CRC of the PDCCH indicating the beam change indication may be masked with the SPS-RNTI. By contrast, unless the beam change indication indicates the release of the SPS resource allocation, the CRC of the PDCCH indicating the beam change indication may be masked with the C-RNTI.

Thereafter, upon receiving the UL beam feedback information containing the information regarding the release of the UL SPS resource allocation, the UE 610 releases the UL SPS resource allocation (1305). The UE 610 receives, from the base station 630, a UL SPS resource allocation activation message to activate a new UL SPS resource allocation (1307).

FIG. 14 illustrates a method for allocating a resource based on SPS in a beamforming system according to the third embodiment of the present disclosure. Specifically, the instant example is directed to a method for including SPS resource allocation release-related information (SPS-Release-Info) of UL and SPS resource allocation activation-related information (SPS-Activation-Info) of UL in a UL beam feedback.

Referring to FIG. 14, the base station 630 determines whether to release the UL SPS resource allocation depending on whether the UL RX beam changes (1401). In other words, where the RX beam determined at the current time is changed from the RX beam previously determined, the base station 630 determines to release the UL SPS resource allocation.

When UL SPS resource allocation needs to be released upon sending a UL beam feedback that indicates that the UL optimal TX beam has changed to the UE 610, the base station 630 transmits, to the UE 610, UL beam feedback information containing information regarding the release of UL SPS resource allocation and information regarding activation of a new UL SPS resource allocation. Here, the SPS resource allocation activation-related information (SPS-Activation-Info) may contain information indicating the start subframe corresponding to the activated DL and/or UL SPS resource allocation. In this case, the base station 630 is not required to send additional new UL SPS resource allocation-related information to the UE 610.

At this time, where the beam change indication indicates the release of the SPS resource allocation, the CRC of the PDCCH indicating the beam change indication may be masked with the SPS-RNTI. By contrast, unless the beam change indication indicates the release of the SPS resource allocation, the CRC of the PDCCH indicating the beam change indication may be masked with the C-RNTI.

Thereafter, upon receiving the beam change indication from the base station 630, the UE 610 releases the UL SPS resource allocation which used to be allocated thereto based on the SPS resource allocation release-related information (SPS-Release-Info) contained in the beam change indication (1405). When a corresponding time arrives based on the SPS resource allocation activation-related information (SPS-Activation-Info) contained in the received beam change indication, the UE 610 activates the UL SPS resource allocation (1407).

Figures 15A, 15B:
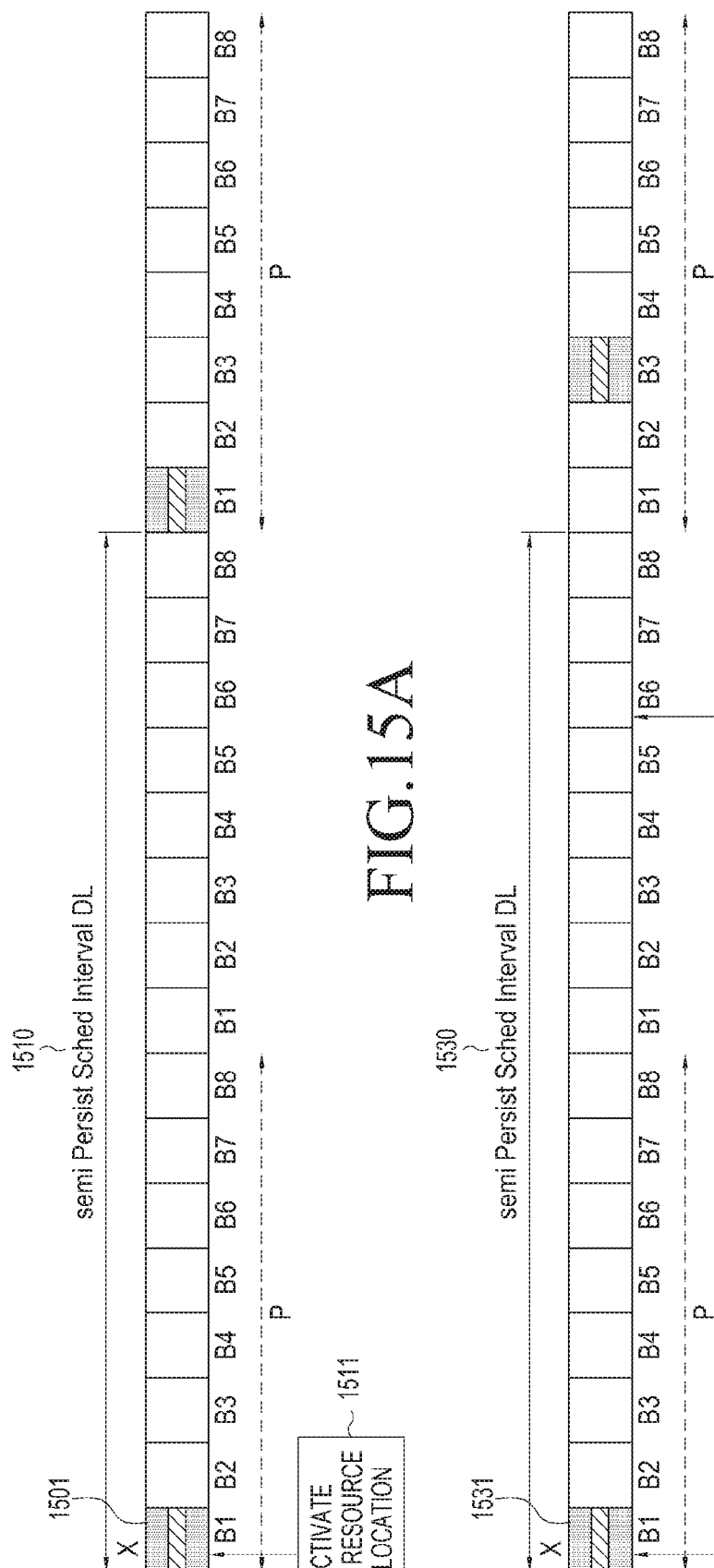
FIGS. 15A and 15B illustrate a method for allocating a resource based on SPS in a beamforming system according to a fourth embodiment of the present disclosure.
Figure 16:
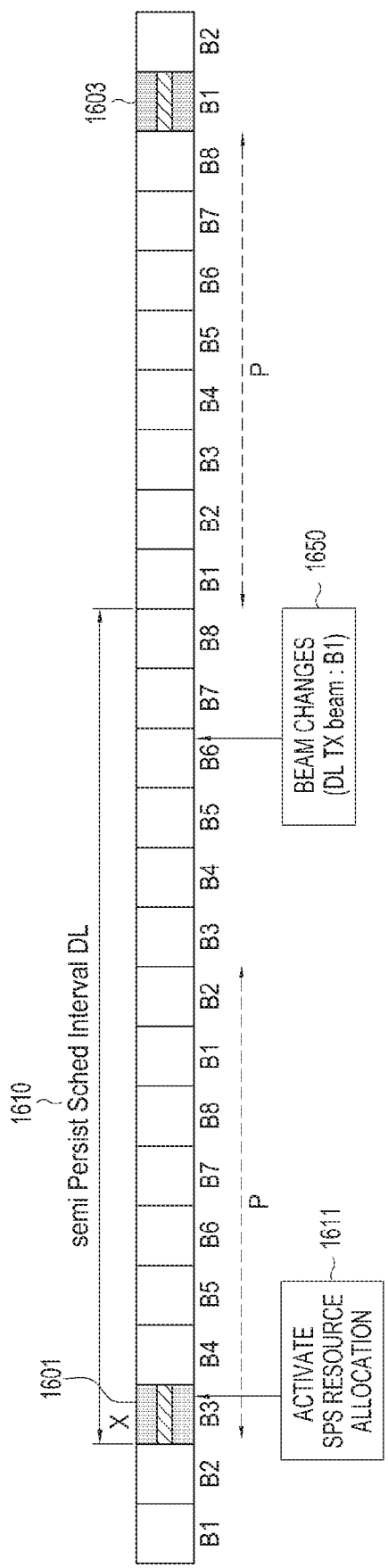
FIGS. 16 and 17 illustrate a method for allocating a resource based on SPS in a beamforming system according to the fourth embodiment of the present disclosure.
Figure 17:
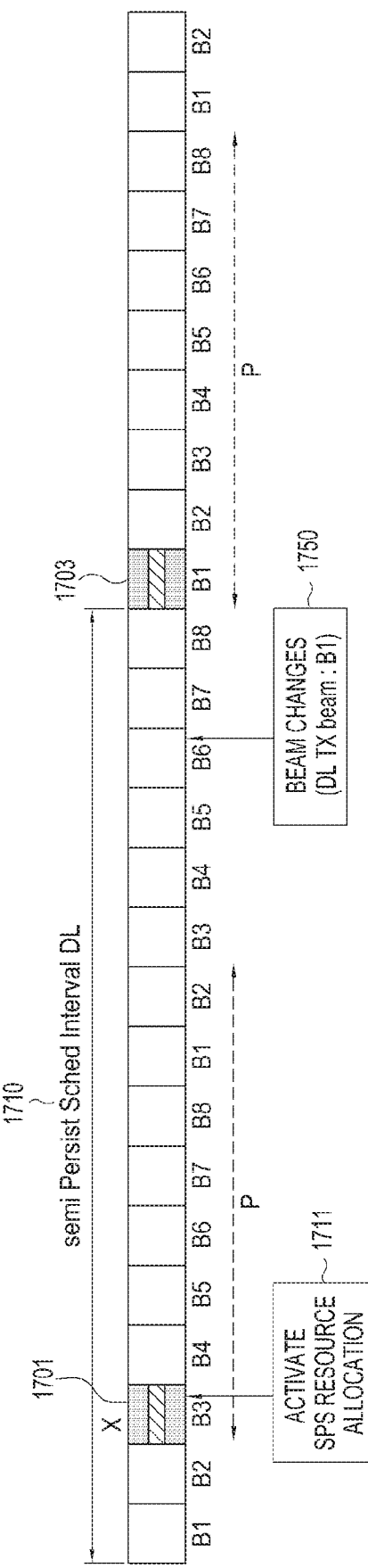

Now described with reference to FIGS. 15 to 17 are methods for allocating a resource based on SPS in a beamforming system according to a fourth embodiment of the present disclosure.

FIGS. 15A and 15B illustrate a method for allocating a resource based on SPS in a beamforming system according to a fourth embodiment of the present disclosure.

Referring to FIGS. 15A and 15B, a subframe or transmission interval may be mapped to one or more beams. Such mapping may be applicable to a particular UE alone or all the UEs within the coverage of the base station. The mapping-related information may be transmitted in a particular signaling (e.g., radio resource control (RRC) signaling) or broadcast message.

In the case of DL SPS, a DL subframe is mapped to one or more DL TX beams. In the case of UL SPS, a UL subframe is mapped to one or more UL RX beams. The base station may allocate SPS resources (i.e., frequency resources or physical resource blocks (PRBs)). The UE uses one of P subframes when the SPS interval allocated by the base station as the SPS resource begins. In this case, each subframe is mapped to one or more DL TX beams in the case of DL SPS or one or more UL RX beams in case of UL SPS. When each subframe is mapped to N beams, and the number of beams is M, P is M/N. In this embodiment, the subframe-beam mapping information may correspond to P subframes from the beginning of the SPS interval, P particular subframes within the SPS interval, or all of the subframes within the SPS interval.

In other words, referring to FIG. 15A, the SPS interval 1510 for DL may be 16 subframes, and beam mapping is applied to only P subframes from the beginning. In other words, since the beam mapping information does not apply to the 9th to 16th subframes, which do not fall with the eight subframes from the beginning, DL SPS data cannot be received therethrough. Referring to FIG. 15A, SPS resource allocation is activated in subframe X 1501 (1511). The SPS interval for DL starts at X, X+16, and X+32. Under the assumption that the current DL TX beam is a first beam B1, the UE may check whether the subframe corresponding to B1 among the P subframes contains data.

Referring to FIG. 15B, although SRS-base station resource allocation is activated (1533) in the subframe 1531 of the SPS interval 1530 for DL, the DL TX beam is changed (1535) from B1 to B3 in the middle of the SPS interval 1530 for DL. Since the DL TX beam changes, the UE needs to identify the subframe corresponding to B3, but not B1, among the P subframes when the next SPS interval starts. In this case, the information indicating the start subframe (i.e., the subframe corresponding to B3) corresponding to the changed DL resource allocation may be contained in the beam change indication or beam feedback that is sent from the base station.

The UE may use the resource corresponding to the UL subframe corresponding to the UL RX beam in UL SPS, similar to DL SPS. When beam reciprocity is put to use, a DL TX beam change means a UL RX beam change. Thus, the UE may use the subframe corresponding to the changed UL RX beam. Unless beam reciprocity is used, the base station needs to notify the UE of the UL RX beam change, and the UE may use the subframe corresponding to the changed UL RX beam through the change information.

Meanwhile, beam identity (ID)-subframe mapping is associated with SPS interval start, and its relevant description is made below separately in connection with the respective embodiments of FIGS. 16 and 17.

FIGS. 16 and 17 illustrate a method for allocating a resource based on SPS in a beamforming system according to the fourth embodiment of the present disclosure.

Referring to FIG. 16, subframe-beam mapping may be defined regardless of SPS. In other words, the start of the SPS interval 1610 may be the subframe 1601 where the activation 1611 of SPS resource allocation through the PDCCH starts. As an example, since the DL TX beam for UE is B3, the UE may receive an SPS activation message through the PDCCH from the base station in the subframe 1601 corresponding to B3. The SPS interval 1610 starts at the subframe 1601 for B3, and the SPS interval 1610 is 16 subframes long. In this case, when the beam is changed (1650) to B1 in the middle of the SPS interval 1610, the UE may identify the DL SPS resource in the subframe 1603 corresponding to B1 among the P subframes of the next SPS interval.

Referring to FIG. 17, subframe-beam mapping is defined regardless of SPS. The SPS interval and start position may previously be allocated. Thus, the subframe 1701 where SPS resource allocation starts to be activated (1710) through the PDCCH from the base station is not the start of the SPS interval. Since the DL TX beam for UE is B3, the UE receives an SPS activation message through the PDCCH from the base station in the subframe 1701 corresponding to B3, and the SPS interval is 16 subframes long. In this case, when the beam is changed (1750) to B1 in the middle of the SPS interval 1710, the UE may identify the DL SPS resource in the subframe 1703 corresponding to B1 among the P subframes of the next SPS interval.

According to an embodiment of the present disclosure, the base station may define an SPS zone. The SPS zone is a set of subframes. Each subframe in the set is mapped to a particular beam or a plurality of beams. The SPS zone may periodically occur. At least one of the SPS period, start of SPS zone, size of SPS zone, and subframe-beam mapping information may be signaled by the base station. The SPS resource is allocated to the UE present within the SPS zone.

According to an embodiment of the present disclosure, the base station may provide the UE with a subframe table containing information about the subframe where SPS resource may be used. The subframe table includes information about one or more beam IDs corresponding to each subframe and information related to an operation predetermined according to the beam ID. In other words, the UE may use the SPS resource of the subframe corresponding to the serving beam ID based on the subframe table. As an example, the subframe table may be configured as shown in Table 1 below.

TABLE 1

| Subframe | BeamID | Operation |
|---|---|---|
| X | M | When beam ID is M, SPS resource allocated to subframe X is used. |
| Y | N | When beam ID is N, SPS resource allocated to subframe Y is used. |

The base station may transmit subframe-beam mapping information about the beam adjacent to the serving beam being currently in use to the UE.

In an embodiment, the base station may configure a table of SPS resource available subframes as shown in Table 2 below.

TABLE 2

| Sub-frame | BeamID | Resource information | Operation |
|---|---|---|---|
| X | M | R1 | When beam ID is M, R1 SPS resource allocated to subframe X is used. |
| Y | N | R2 | When beam ID is N, R2 SPS resource allocated to subframe Y is used. |

Embodiments of SPS-based resource allocation methods have been described above in connection with FIGS. 3 to 17. Now described are methods in which a base station and a UE in a communication system allocate resources based on SPS with reference to FIGS. 18 and 19, according to embodiments of the present disclosure. In the following description, the term "beam" refers to a DL TX beam, DL RX beam, UL TX beam, and UL RX beam.

Figure 18:
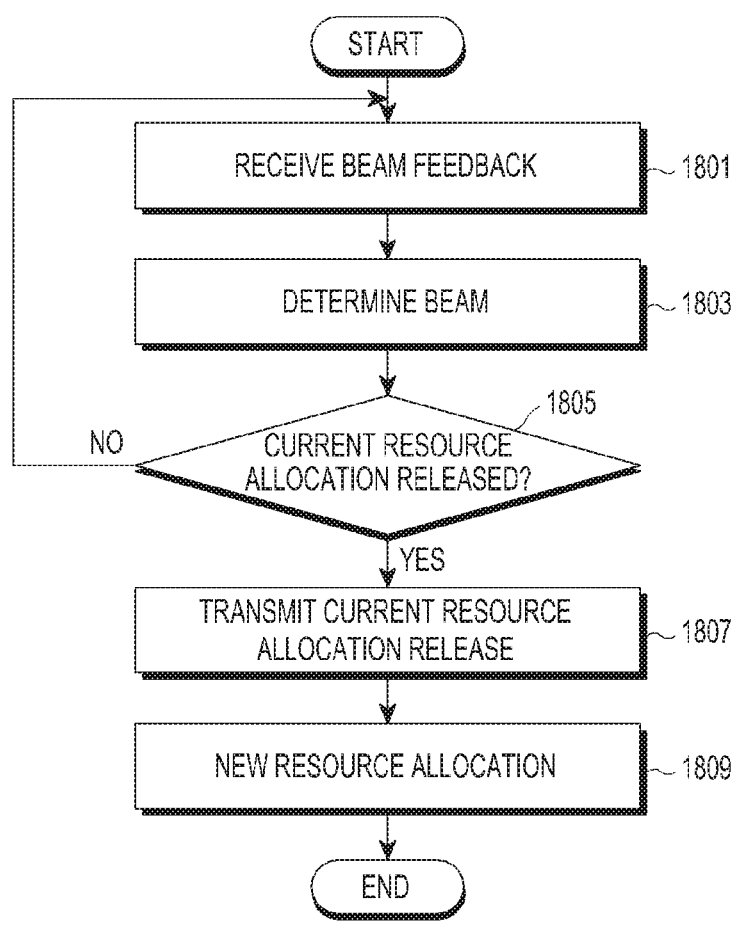
FIG. 18 illustrates a method for allocating a resource based on SPS in a base station included in a communication system according to an embodiment of the present disclosure.

FIG. 18 illustrates a method for allocating a resource based on SPS in a base station included in a communication system according to an embodiment of the present disclosure.

Referring to FIG. 18, the base station receives a beam feedback from the UE (1801). The beam feedback includes information about at least one optimal beam used for data transmission between the UE and the base station. The base station determines a beam to be used for data communication between the UE and the base station based on the beam feedback received from the UE (1803).

When the determined beam is one changed from a beam previously used, the base station determines whether to release the current SPS resource allocation (1805). Here, the base station may determine whether to release the current SPS resource allocation based on at least one of the embodiments described above in connection with FIGS. 6 to 14.

Where the base station determines to release the current SPS resource allocation, the base station transmits, to the UE, a message containing information about the SPS resource allocation release indicating to release the current SPS resource allocation (1807). Unless the base station determines to release the current SPS resource allocation, the base station waits to receive a beam feedback from the UE.

The base station allocates a new SPS resource to the changed beam (1809). Here, the base station may allocate a new SPS resource based on at least one of the embodiments described above in connection with FIGS. 3 to 17. Thus, the base station may transmit the SPS resource newly allocated for the changed beam to the UE.

In this case, the operation of the base station activating the new SPS resource allocation may be performed before the operation of sending the SPS resource allocation release message to the UE. In other words, the message containing the SPS resource allocation release-related information may also contain information about additional new SPS resource allocation as described above in connection with FIGS. 6, 7, 9, 10, 11, 12, 13, and 14.

Figure 19:
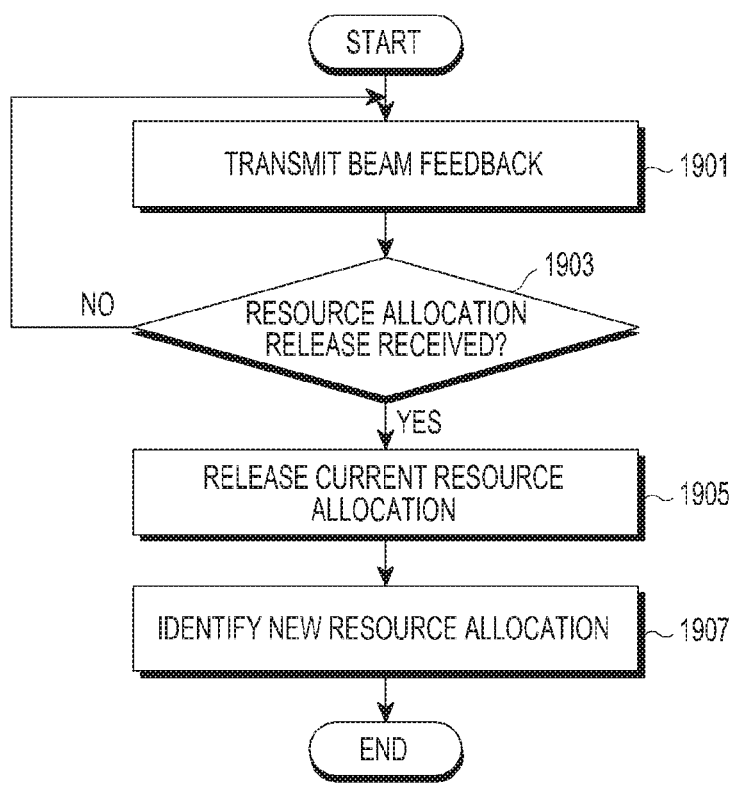
FIG. 19 is a view schematically illustrating a method for allocating a resource based on SPS in a UE included in a communication system according to an embodiment of the present disclosure.

FIG. 19 illustrates a method for allocating a resource based on SPS in a UE included in a communication system according to an embodiment of the present disclosure.

Referring to FIG. 19, the UE transmits, to the base station, a beam feedback containing information about at least one beam used for data communication between the UE and the base station (1901).

Thereafter, the UE identifies whether a message containing information about the release of SPS resource allocation according to the determination by the base station is received (1903). Here, the message includes at least one of information about the release of SPS resource allocation and information about new SPS resource allocation. In this case, the new SPS resource allocation-related information may be transmitted through a message different from the SPS resource allocation release message.

Accordingly, upon receiving the SPS resource allocation release message from the base station, the UE releases the current SPS resource allocation based on the SPS resource allocation release-related information contained in the SPS resource allocation release message (1905). The UE identifies the new SPS resource based on the information regarding the new SPS resource allocation (1907).

Embodiments of SPS-based resource allocation methods in a base station and a UE in a communication system have been described above. The respective internal configurations of a base station and a UE that perform the embodiments of the present disclosure are described below with reference to FIGS. 20 and 21.

Figure 20:
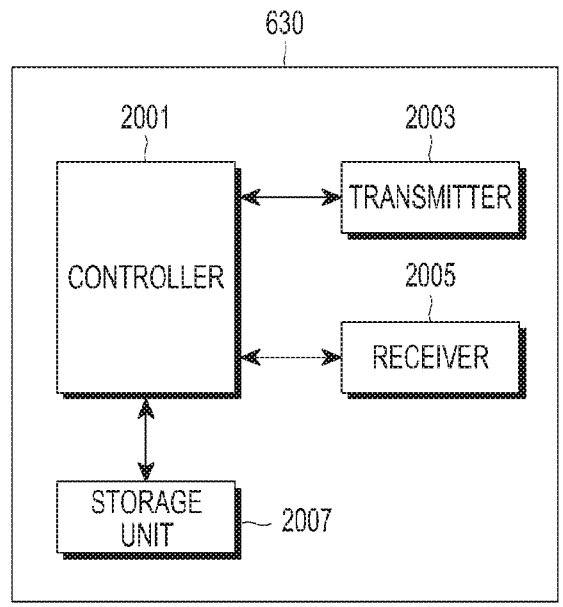
FIG. 20 is a view schematically illustrating an internal configuration of a base station for allocating a resource based on SPS in a communication system according to an embodiment of the present disclosure.

FIG. 20 illustrates an internal configuration of a base station for allocating a resource based on SPS in a communication system according to an embodiment of the present disclosure.

Referring to FIG. 20, a base station 630 includes a controller 2001, a transmitter 2003, a receiver 2005, and a storage unit 2007.

The controller 2001 controls the overall operation of the base station 630, particularly, resource allocation-related operations according to an embodiment of the present disclosure. The resource allocation-related operations are the same as those described above in connection with FIGS. 3 to 17, and no detailed description thereof is repeated.

The transmitter 2003 transmits various signals and messages to other entities included in the communication system under the control of the controller 2001. Here, the signals and messages transmitted by the transmitter 2003 are the same as those described above in connection with FIGS. 3 to 7, and no detailed description thereof is repeated.

The receiver 2005 receives various signals and messages from other entities included in the communication system under the control of the controller 2001. Here, the signals and messages received by the receiver 2005 are the same as those described above in connection with FIGS. 3 to 17, and no detailed description thereof is repeated.

The storage unit 2007 stores programs and various data related to resource allocation-related operations performed by the base station 630 under the control of the controller 2001 according to an embodiment of the present disclosure. The storage unit 2007 stores various signals and messages received by the receiver 2005 from other entities.

Although FIG. 20 illustrates that the base station 630 includes separate units, such as the controller 2001, the transmitter 2003, the receiver 2005, and the storage unit 2007, the base station 630 may be implemented in such a manner that at least two of the controller 2001, the transmitter 2003, the receiver 2005, and the storage unit 2007 are integrated together. Further, the base station 630 may be implemented in a single processor.

Figure 21:
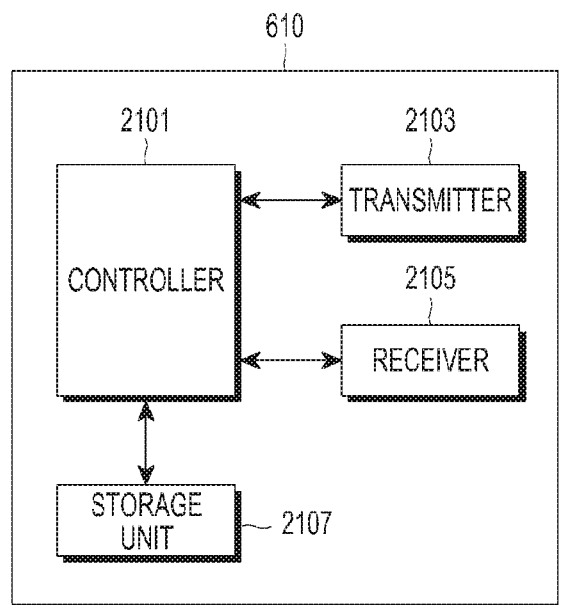
FIG. 21 is a view schematically illustrating an internal configuration of a UE for allocating a resource based on SPS in a communication system according to an embodiment of the present disclosure.

FIG. 21 illustrates an internal configuration of a UE 610 for allocating a resource based on SPS in a communication system according to an embodiment of the present disclosure.

Referring to FIG. 21, a UE 610 includes a controller 2101, a transmitter 2103, a receiver 2105, and a storage unit 2107.

The controller 2101 controls the overall operation of the UE 610, particularly, resource allocation-related operations according to an embodiment of the present disclosure. The resource allocation-related operations are the same as those described above in connection with FIGS. 3 to 17, and no detailed description thereof is repeated.

The transmitter 2103 transmits various signals and messages to other entities included in the communication system under the control of the controller 2101. Here, the signals and messages transmitted by the transmitter 2103 are the same as those described above in connection with FIGS. 3 to 17, and no detailed description thereof is repeated.

The receiver 2105 receives various signals and messages from other entities included in the communication system under the control of the controller 2101. Here, the signals and messages received by the receiver 2105 are the same as those described above in connection with FIGS. 3 to 17, and no detailed description thereof is repeated.

The storage unit 2107 stores programs and various data related to resource allocation-related operations performed by the UE 610 under the control of the controller 2101 according to an embodiment of the present disclosure. The storage unit 2107 stores various signals and messages received by the receiver 2105 from other entities.

Although FIG. 21 illustrates that the UE 610 includes separate units, such as the controller 2101, the transmitter 2103, the receiver 2105, and the storage unit 2107, the UE 610 may be implemented in such a manner that at least two of the controller 2101, the transmitter 2103, the receiver 2105, and the storage unit 2107 are integrated together. Further, the UE 610 may be implemented in a single processor.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a base station in a communication system, the method comprising:
   identifying a first beam at a first timing for a user equipment (UE);
   releasing resource allocation for a second beam at a second timing for the UE;
   transmitting information including first information related to release of the resource allocation for the second beam, the first information including information for releasing semi-persistent scheduling (SPS) resource allocation;
   allocating a resource for the first beam; and
   transmitting second information related to the resource allocation for the first beam to the UE,
   wherein the second timing is before the first timing, and the first beam is different from the second beam.

2. The method of claim 1, wherein the resource for the first beam is allocated based on at least one of state information of the UE or information about an antenna array included in the base station.

3. The method of claim 1, wherein the resource allocation for the second beam is released when a predetermined time expires.

4. The method of claim 1, wherein the second information includes at least one of information about the first beam, information about a release of the resource allocation for the second beam, or information about the resource allocation for the first beam, and
   wherein the information about the resource allocation for the first beam includes at least one piece of information indicating a start of a subframe corresponding to the resource for the first beam.

5. The method of claim 1, wherein the resource for the first beam is allocated at least one subframe included within a predetermined scheduling interval.

6. A method of a user equipment (UE) in a communication system, the method comprising:
   transmitting, to a base station, information about a first beam at a first timing for the UE;
   receiving information including first information related to release of resource allocation for a second beam at a second timing for the UE, the first information including information for releasing semi-persistent scheduling (SPS) resource allocation;
   receiving second information related to resource allocation for the first beam; and
   identifying a resource based on the second information,
   wherein the second timing is before the first timing, and the first beam is different from the second beam.

7. The method of claim 6, wherein the resource for the first beam is allocated based on at least one of state information of the UE or information about an antenna array included in the base station.

8. The method of claim 6, wherein the second information includes at least one of information about the first beam, information about a release of the resource allocation for the second beam, or information about the resource allocation for the first beam, and
wherein the information about the resource allocation for the first beam includes at least one piece of information indicating a start of a subframe corresponding to the resource for the first beam.

9. The method of claim 6, wherein the resource allocation for the second beam is released when a predetermined time expires.

10. The method of claim 6, wherein the resource for the first beam is allocated at least one subframe included within a predetermined scheduling interval.

11. A base station in a communication system, comprising:
a transceiver configured to transmit and receive data; and
a controller configured to:
identify a first beam at a first timing for a user equipment (UE);
release resource allocation for a second beam at a second timing for the UE;
transmit information including first information related to release of the resource allocation for the second beam, the first information including information for releasing semi-persistent scheduling (SPS) resource allocation;
allocate a resource for the first beam; and
transmit second information related to the resource allocation for the first beam to the UE,
wherein the second timing is before the first timing, and the first beam is different from the second beam.

12. The base station of claim 11, wherein the resource for the first beam is allocated based on at least one of state information of the UE or information about an antenna array included in the base station.

13. The base station of claim 11, wherein the resource allocation for the second beam is released when a predetermined time expires.

14. The base station of claim 11, wherein the second information includes at least one of information about the first beam, information about the release of the resource allocation for the second beam, or information about the resource allocation for the first beam, and
wherein the information about the resource allocation for the first beam includes at least one piece of information indicating a start of a subframe corresponding to the resource for the first beam.

15. The base station of claim 11, wherein the resource for the first beam is allocated at least one subframe included within a predetermined scheduling interval.

16. A user equipment (UE) in a communication system, comprising:
a transceiver configured to transmit and receive data; and
a controller configured to:
transmit, to a base station, information about a first beam at a first timing for the UE;
receive information including first information related to release of resource allocation for a second beam at a second timing for the UE, the first information including information for releasing semi-persistent scheduling (SPS) resource allocation;
receive second information related to resource allocation for the first beam; and
identify a resource based on the second information,
wherein the second timing is before the first timing, and the first beam is different from the second beam.

17. The UE of claim 16, wherein the resource for the first beam is allocated based on at least one of state information of the UE or information about an antenna array included in the base station.

18. The UE of claim 16, wherein the second information includes at least one of information about the first beam, information about a release of the resource allocation for the second beam, or information about the resource allocation for the first beam, and
wherein the information about the resource allocation for the first beam includes at least one piece of information indicating a start of a subframe corresponding to the resource for the first beam.

19. The UE of claim 16, wherein the resource allocation for the second beam is released when a predetermined time expires.

20. The UE of claim 16, wherein the resource for the first beam is allocated to at least one subframe included within a predetermined scheduling interval.

21. The method of claim 1, wherein a cyclical redundancy check (CRC) of a physical downlink control channel (PDCCH) is masked with a SPS radio network temporary identifier (RNTI) in case that the first information is transmitted.

22. The method of claim 6, wherein a cyclical redundancy check (CRC) of a physical downlink control channel (PDCCH) is masked with a SPS radio network temporary identifier (RNTI) in case that the first information is transmitted.

23. The base station of claim 11, wherein a cyclical redundancy check (CRC) of a physical downlink control channel (PDCCH) is masked with a SPS radio network temporary identifier (RNTI) in case that the first information is transmitted.

24. The UE of claim 16, wherein a cyclical redundancy check (CRC) of a physical downlink control channel (PDCCH) is masked with a SPS radio network temporary identifier (RNTI) in case that the first information is transmitted.

* * * * *